June 28, 1949.　　　　T. S. KERANEN　　　　2,474,362
HELICOPTER

Filed Sept. 14, 1944　　　　　　　　　　5 Sheets-Sheet 1

Inventor
THEODORE S. KERANEN,

By　*Clarence A. O'Brien
and Harvey B. Jacobson*
Attorneys

Inventor
THEODORE S. KERANEN,

June 28, 1949.　　　　T. S. KERANEN　　　　2,474,362
HELICOPTER

Filed Sept. 14, 1944　　　　　　　　　　5 Sheets-Sheet 3

Theodore S. Keranen, Inventor

By Clarence A. O'Brien
and Harvey B. Jacobson
Attorneys

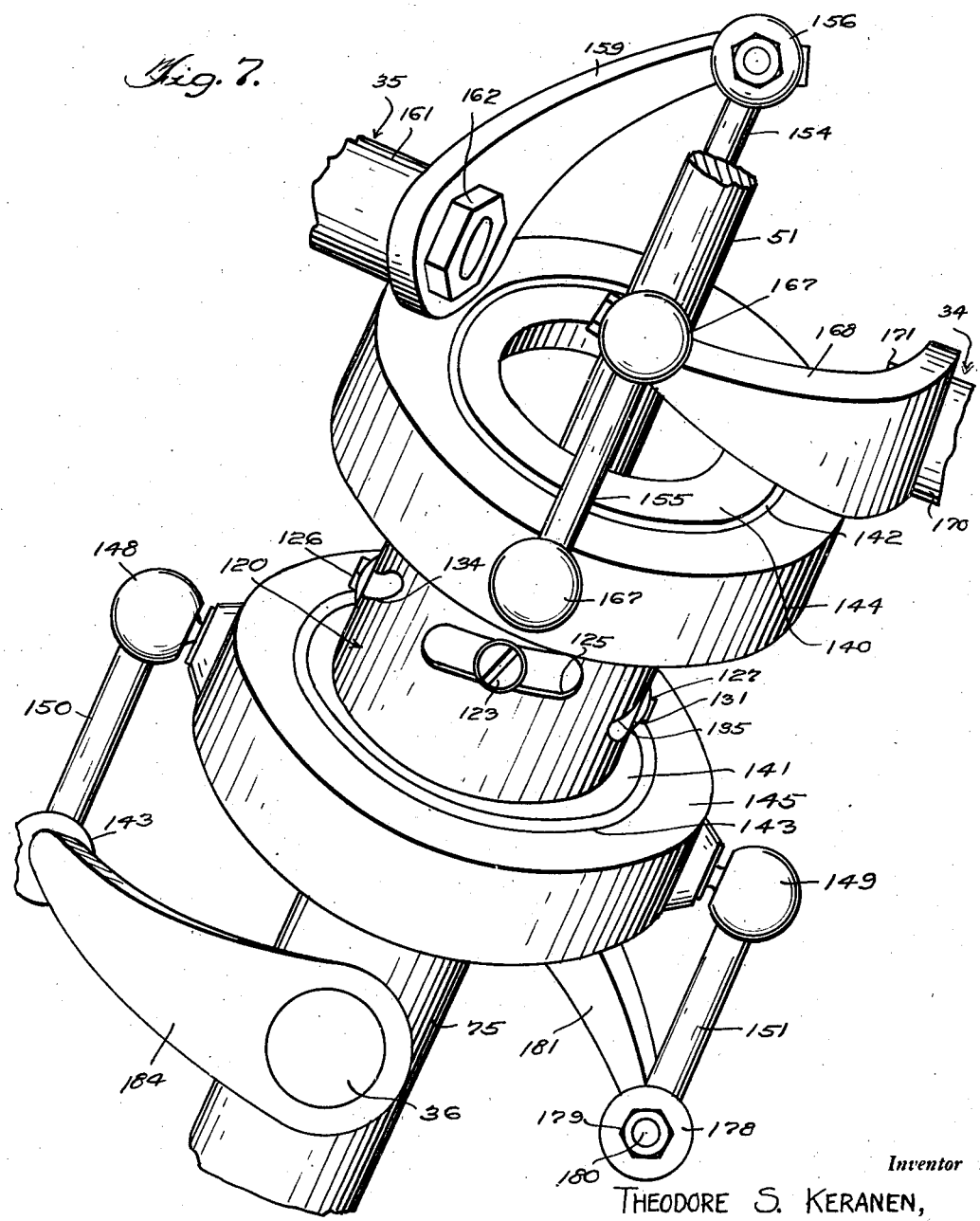

June 28, 1949.  T. S. KERANEN  2,474,362
HELICOPTER
Filed Sept. 14, 1944  5 Sheets-Sheet 5
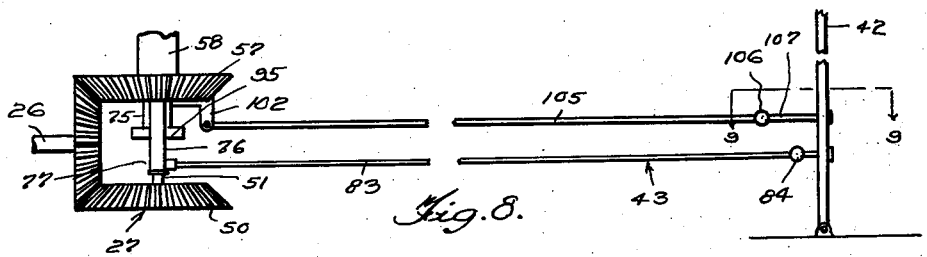
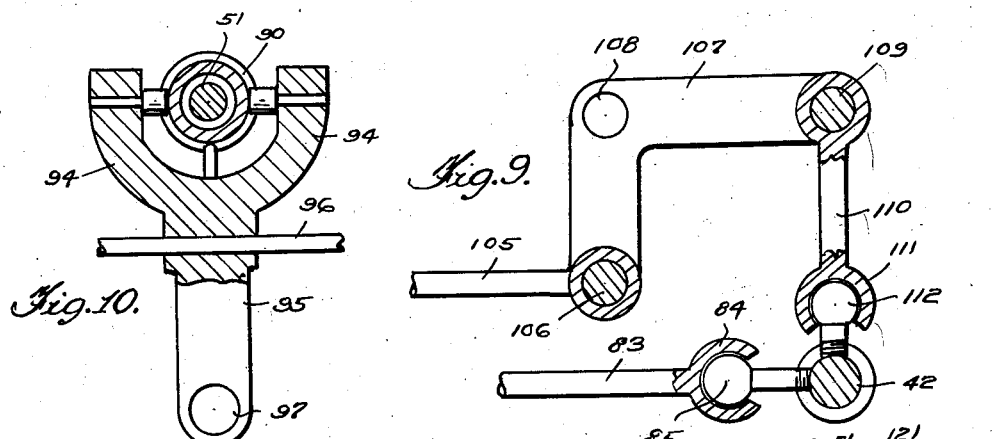
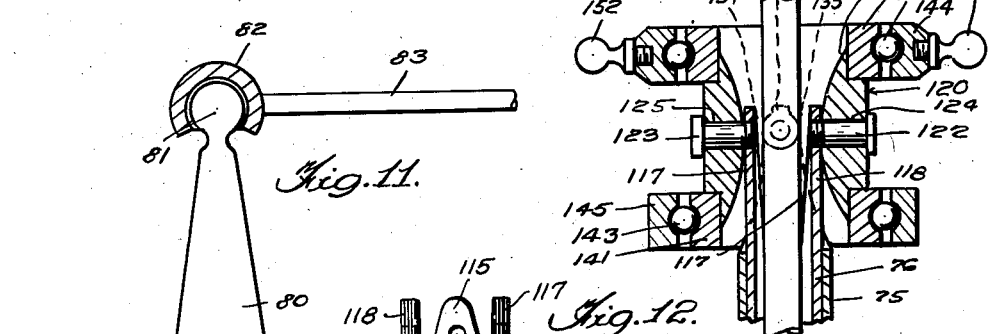
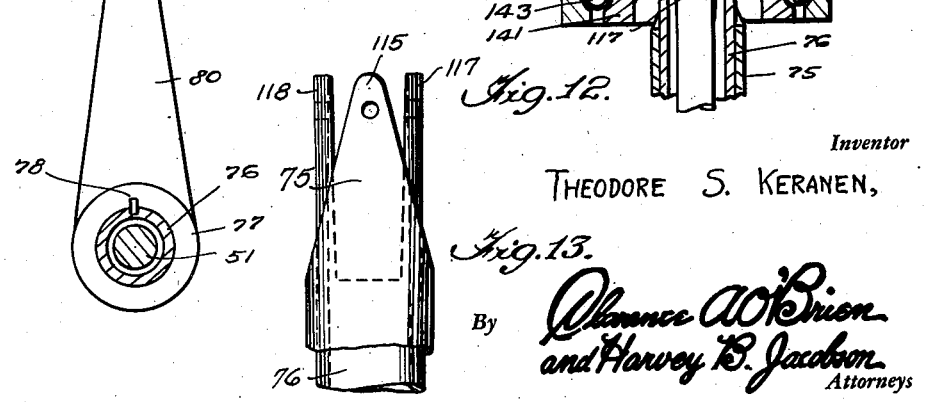
Inventor
THEODORE S. KERANEN,
By Clarence A. O'Brien
and Harvey B. Jacobson
Attorneys Patented June 28, 1949

2,474,362

UNITED STATES PATENT OFFICE 2,474,362

HELICOPTER

Theodore S. Keranen, Detroit, Mich.

Application September 14, 1944, Serial No. 554,072

1 Claim. (Cl. 170—135.24)

This invention relates to a helicopter, and more particularly to an improved method for controlling a helicopter.

The primary object of this invention is the provision of an improved control means for helicopters having rotors, whereby the pitch of the rotor blades is varied during each rotation thereof in such manner that the advancing blades have a different pitch from the retreating blades.

An additional object is the provision of such means for varying the angle of pitch of the advancing and retreating rotor blades of a helicopter having two counter-rotating rotors.

Still another object is the provision of a helicopter which may be wholly controlled by the angle of pitch of the blades of the rotors, without the necessity for varying the axes of rotation of the rotors angularly.

A still further object is the provision of control means whereby the difference between the pitch of the advancing and retreating rotor blades may be varied as desired.

A still further object is the provision, in a helicopter having counter-rotating rotors, of means for simultaneously varying the pitch of the advancing and retreating blades of both rotors in a predetermined ratio.

Still another object is the provision, in a helicopter having counter-rotating rotors, of means for varying the ratio of the pitch of the blades of one rotor with respect to the pitch of the blades of the other.

Still another important object is the provision of a helicopter wherein the direction of flight, either straight up and down vertically, forwardly, or rearwardly, or to the right or left, may be varied solely by variation of the pitch of the rotor blades.

Other objects reside in the combination of elements, arrangement of parts and features of construction, all as will be more fully pointed out hereinafter and disclosed in the accompanying drawings, wherein there is shown a preferred embodiment of this inventive concept.

In the drawings:

Figure 7 is an enlarged perspective view of certain constructional elements.

Figure 8 is a schematic elevational view of a portion of the control system for the helicopter.

Figure 9 is a sectional view taken substantially along the line 9—9 of Figure 8, as viewed in the direction indicated by the arrows.

Figure 10 is an enlarged sectional view taken substantially along the line 10—10 of Figure 6.

Figure 11 is an enlarged sectional view taken substantially along the line 11—11 of Figure 6 and viewed in the direction indicated by the arrows, and Figure 12 is a sectional view taken along the line 12—12 of Figure 3, as viewed in the direction indicated by the arrows.

Figure 13 is a fragmentary elevational view of a constructional detail, certain concealed parts thereof being indicated in dotted lines, and other parts being omitted.

Like reference numerals refer to like parts throughout the several views of the drawings.

Figure 1:
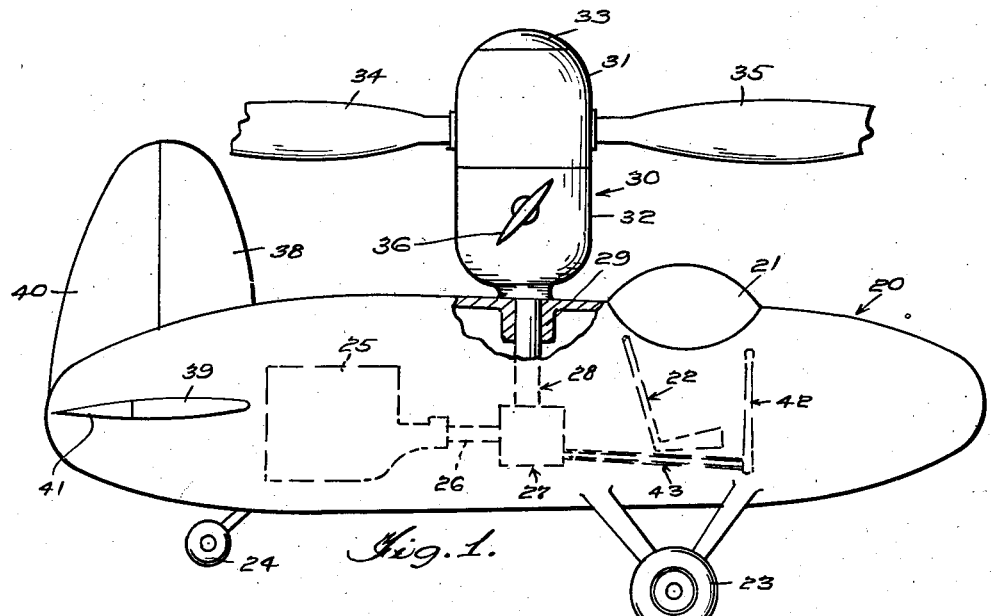
Figure 1 is a side elevational view, partially in section, of a helicopter embodying features of this inventive concept, certain parts thereof being indicated by dotted lines.
Figure 2:
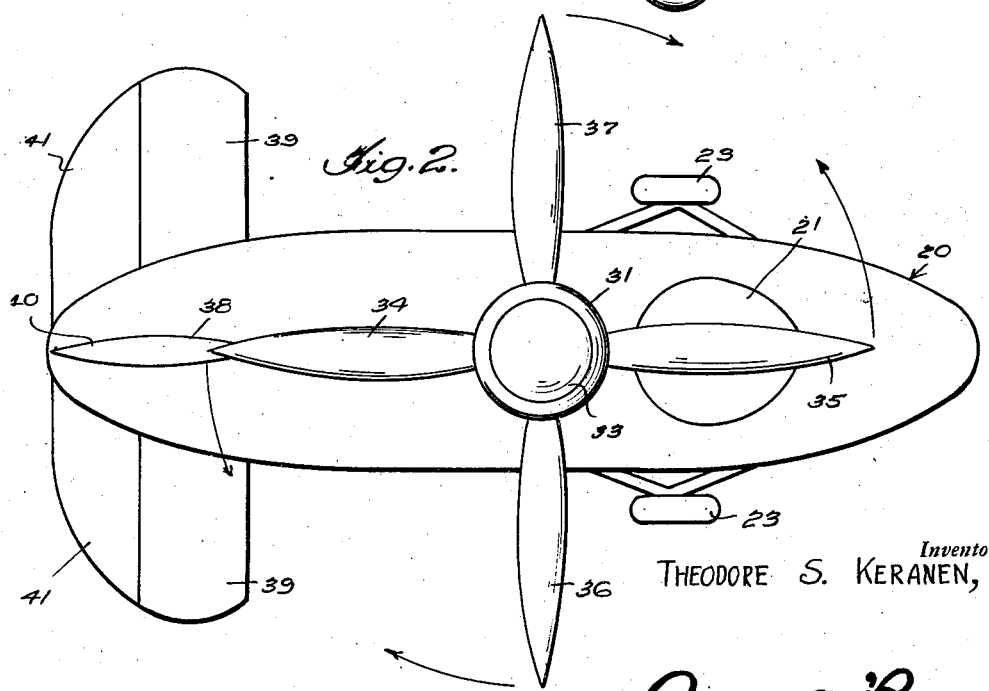
Figure 2 is a top plan view of the helicopter shown in Figure 1.

Having reference now to the drawings, and more particularly to Figures 1 and 2, there is generally indicated at 20 a helicopter body having a cockpit 21 and an operator's position 22 therein, front and rear landing wheels 23 and 24, respectively, and containing a motor 25 provided with a drive shaft 26. Drive shaft 26 extends to a transmission generally indicated at 27, to be more fully described hereinafter. A control shaft generally indicated at 28, also to be described more fully hereinafter, extends through a suitable bearing 29 in the fuselage, to a rotor hub generally indicated at 30, comprised of a casing including an upper section 31, a lower section 32, and a top 33. Sections 31 and 32 are each provided with rotor blades 34 and 35, and 36 and 37, respectively, and sections 31 and 32 are adapted to be driven for rotation in opposite directions, in a manner to be more fully pointed out hereinafter. Auxiliary control means comprised of vertical and horizontal stabilizers 38 and 39, respectively, a rudder 40, and elevators 41, may be provided if desired, although the helicopter is operable, as will be pointed out hereinafter, without such auxiliary controls. Positioned within the cockpit 21 is a control stick 42 connected through controls generally indicated at 43 and in a manner to be described hereinafter with means for varying the pitch of the rotor blades.

Figure 3:
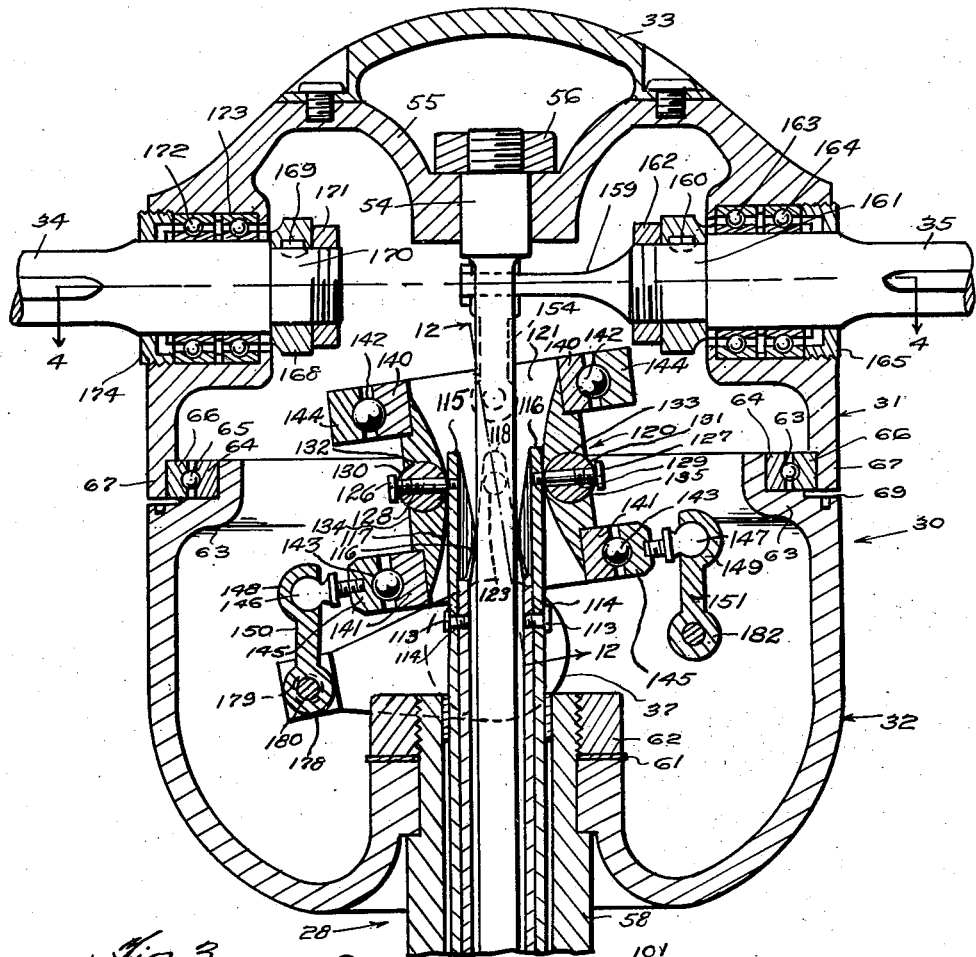
Figure 3 is an enlarged sectional view taken through the center line of the hub of the rotors of the helicopter.
Figure 3:
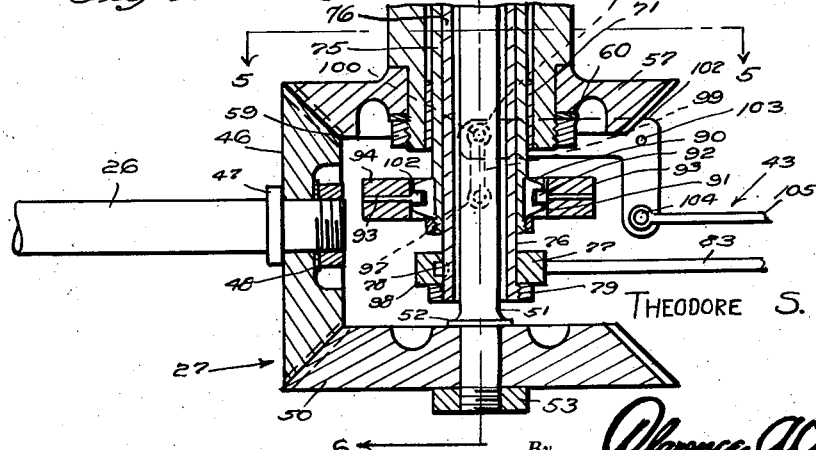
Figures 5, 6:
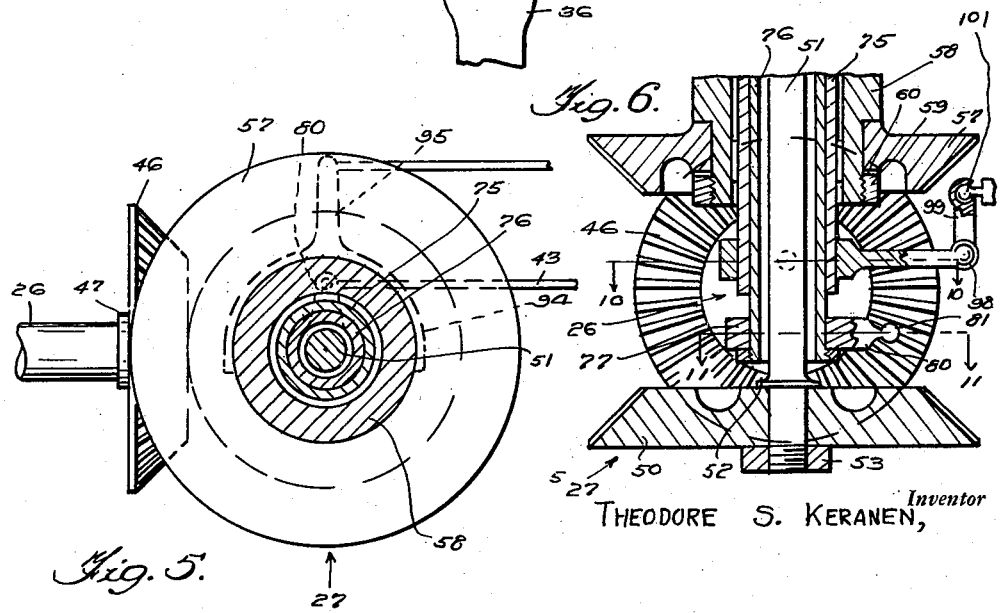
Figure 5 is a sectional view taken substantially along the line 5—5 of Figure 3, viewed in the direction indicated by the arrows.
Figure 6 is a sectional view taken substantially along the line 6—6 of Figure 3, as viewed in the direction indicated by the arrows.

Referring back now to transmission 27, as best shown in Figures 3 and 6, drive shaft 26 has a bevel gear 46 splined thereto and held in place between a collar 47 on shaft 26 and a washer 48 on the opposite side of the gear, as by a holding nut 49. Gear 46 is adapted to engage a bevel gear 50 to which is splined a drive shaft 51 provided with a collar 52 and held in place as by a nut 53. Drive shaft 51 extends upwardly from the transmission through rotor hub 30, and is fixedly secured at its upper extremity 54 in a flange 55 comprising an integral part of upper portion 31 of hub 30, being secured thereto as by splines and a lock nut 56, in such manner that rotation of drive shaft 51 through drive shaft 26 and gears 46 and 50 occasions rotation of the upper portion 31 of the hub 30.

Gear 46 also drives a second bevel gear 57 splined to a sleeve 58 coaxial with and surrounding drive shaft 51, and is secured on sleeve 58, as by a lock nut 59 and washer 60. Sleeve 58 also extends upwardly out of the fuselage, and comprises the exterior portion of the driving column previously referred to as being generally indicated at 28. The upper extremity of sleeve 58 is suitably secured in an aperture in the lower portion of lower member 32 of rotor hub 30 and secured thereto, as by means of a washer 61 and lock nut 62, the arrangement being such that portion 32 driven by gear 57 thus rotates oppositely with respect to the portion 31 of hub 30 driven by gear 50. Means are provided for facilitating the counter-rotation of the portions 31 and 32 of hub 30, such means taking the form of an inwardly turned flange 63 about the upper surface of portion 32 to which is secured one-half 64 of a ball race provided with bearings 65, the other half 66 of the ball race being secured to a flange 67 peripherally positioned about the lower surface of hub portion 31. The space between the two portions is sealed against the escape of lubricant, as by a gasket 69.

The sleeve 58 is mounted for free rotation on needle bearings 70 and 71 positioned between sleeve 58 and an interiorly positioned sleeve 75, surrounding a second sleeve 76, within which latter drive shaft 51 is positioned for free rotation. Sleeves 75 and 76 serve to control the pitch of the rotor blades, in a manner now to be described.

Secured to the lower end of sleeve 76 is a collar 77 held in position against rotation, as by a spline 78, and secured on the sleeve by a lock nut 79. Collar 77 is, as best shown in Figure 11, provided with an extending arm 80 terminating in a ball 81 engaged by a socket 82 from which extends a control rod 83 comprising a portion of the control means heretofore generally designated by the reference character 43. The opposite end of control rod 83 terminates, as best shown in Figure 9, in a socket 84 engaging a ball 85 threadedly secured to control rod 42. From the foregoing it will now be seen that movement of the control rod 42, in a fore and aft direction, will effect rotation of control sleeve 76 through the connections above described, for a purpose to be more fully pointed out hereinafter.

Secured about the lower extremity of sleeve 75 is a collar 90 having a peripheral groove 91 therein, within which are adapted to engage shoes 92 pivotally mounted, as on pivots 93, in the bifurcations 94 (see Fig. 10) of a lever 95.

Lever 95 is pivoted, as on a pivot pin 96, the extremities of which are secured in any desired manner to the walls of the transmission (not shown), and provided at its extremity with a ball 97. Ball 97 engages, as best shown in Figure 6, in a socket 98 formed at one end of a link 99, the other end of which is provided with a socket 100 adapted to engage a ball 101 secured to the end of a bell crank lever 102 pivotally mounted, as on a pivot 103, secured to the walls of the transmission housing. The other end of bell crank lever 102 has pivotally secured thereto, as on a pivot 104, a control rod 105. The opposite end of control rod 105 is pivotally secured, as best shown in Figure 9, on a pivot 106 mounted on one end of a bell crank lever 107 which in turn is pivoted on a vertical pivot 108 adjacent control lever 42. The opposite end of bell crank lever 107 has secured thereto, as on a pivot 109, a link 110 terminating in a socket 111 surrounding a ball 112 secured to control lever 42.

From the foregoing it will now be seen that movement of the control rod 42 to the right or left with respect to the axis of the helicopter will occasion, through the linkage above described, a movement of the sleeve 75 upwardly or downwardly, for a purpose to be described hereinafter. Sleeve 75 is secured to sleeve 76 adjacent its upper extremity, as by means of screws 113 engaging suitable threaded apertures in sleeve 76 and passing through transverse slots 114 in sleeve 75, the arrangement being such that sleeve 75 is free to rotate, when actuated by control lever 83 in the manner previously described, with respect to sleeve 76, but when sleeve 76 is moved upwardly or downwardly in the manner just above described, sleeve 75 is moved therewith.

The upper end of sleeve 75 is bifurcated to form a pair of tongues 115 and 116, respectively. Sleeve 76 is also bifurcated at its upper extremity to form a pair of tongues 117 and 118, which tongues extend upwardly to a point adjacent the extremities of tongues 115 and 116, but at substantially right angled relation thereto (see Figure 3).

Surrounding drive shaft 51, at a point adjacent the tongues at the other extremities of sleeves 75 and 76, is a circular collar generally indicated at 120 provided with an interiorly disposed vertical bore 121 tapered outwardly adjacent its extremities and convex in cross section, as best shown in Figures 3 and 12. Oppositely disposed screws 122 and 123 extend outwardly through helical slots 124 and 125, respectively, formed in the collar 120, one of which is best shown in Figure 7, and have their inner ends engaged in suitable threaded apertures in tongues 117 and 118 to hold the collar 120 in movable related assembly with the sleeve 76. As best shown in Figure 3, screws 126 and 127 pass through suitable apertures 128 and 129 in spheres 130 and 131, respectively, and have their inner ends secured in suitable threaded apertures in sleeve 75. Spheres 130 and 131 are adapted to seat respectively in grooves 132 and 133 of substantially circular cross section, and of helical configuration, provided with slots 134 and 135, respectively, through which the heads of screws 126 and 127 extend.

From the foregoing it will now be seen that movement of sleeves 75 and 76, either vertically or rotatably with respect to each other, will effect, due to the engagement of the screws and spheres above mentioned, with their associated helical grooves and slots, a tilting movement of collar 120 with respect to drive shaft 51 and consequently rotor hub 30.

Collar 120 is provided adjacent the ends of bore 121 with two bearings comprised respectively of inner rings 140 and 141 a plurality of ball bearings 142 and 143 and outer rings 144 and 145.

Outer ring 145 is provided, as best shown in Figure 3, with a pair of oppositely disposed balls 146 and 147 adapted to engage respectively in sockets 148 and 149 formed at the extremities of links 150 and 151. Similarly, outer ring 144 is provided with oppositely disposed balls 152 and 153, disposed in right angular relation with respect to the balls 147 and 146, adapted to engage the sockets of corresponding links 154 and 155 (see Fig. 7).

Figure 4:
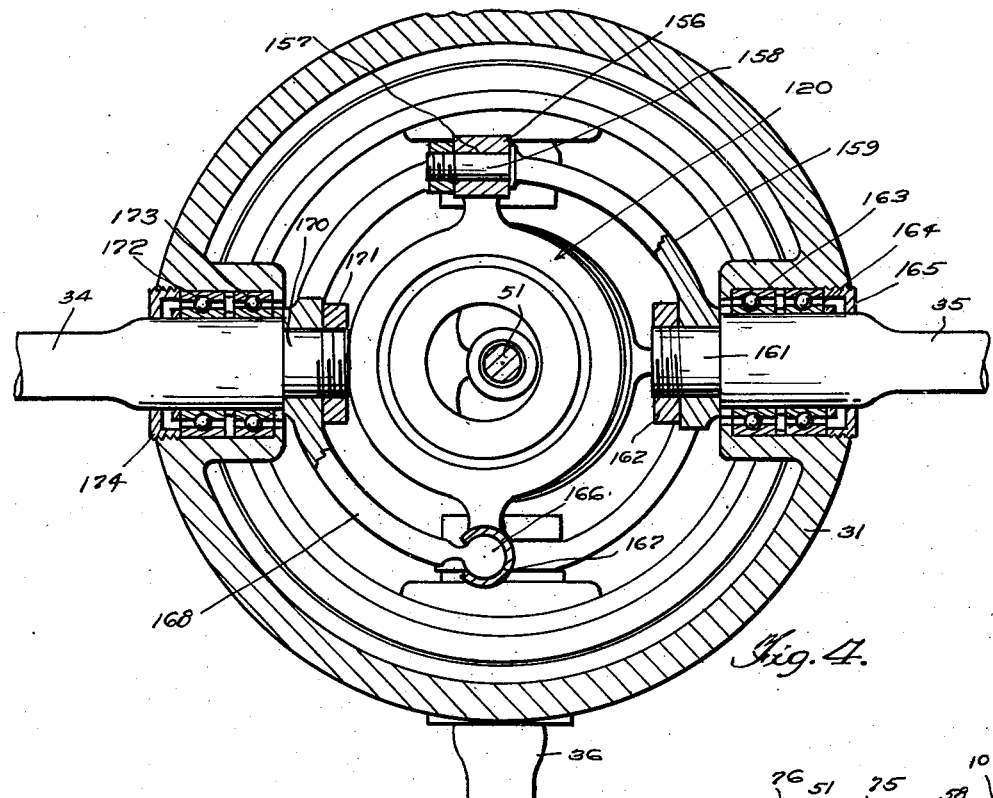
Figure 4 is a sectional view taken substantially along the line 4—4 of Figure 3.

As best shown in Figure 4, link 154 terminates in a cylindrical portion 156 having a bore 157 therethrough adapted to engage the cylindrical end 158 of an arcuate member 159, the opposite end of which is secured, as by a spline 160 (see Fig. 3), to the hub 161 of rotor blade 35, and secured against longitudinal displacement thereon, as by a lock nut 162 engaging a threaded extremity of the blade. Hub 161 of blade 35 is journaled for rotation in a pair of ball races 163 and 164 and held in position in main hub 31, as by a lock nut 165.

The opposite link 155 terminates in a ball 166 adapted to be engaged by a socket 167 comprising the extremity of a similar arcuate arm 168 secured, as by a spline 169, to the hub 170 of rotor blade 34, and secured thereon, as by a lock nut 171. Blade 34 is likewise journaled in a pair of ball races 172 and 173 mounted in casing 31, and secured in position, as by a lock nut 174.

From the foregoing it will now be seen that tilting of collar 120 in the manner previously described effects, through arcuate arms 159 and 168, a corresponding change in pitch in rotor blades 34 and 35.

Referring back now to links 150 and 151, it will be seen by consideration of Figure 7 that link 151 terminates in a cylindrical portion 178 within which is secured, as by a nut 179, a cylindrical portion 180 of an arcuate arm 181 similar in configuration to arm 159. The end of link 150 terminates in a ball 182 adapted to be engaged in a socket 183 comprising the end of an arcuate arm 184 similar in configuration to arm 168, the end of which is secured to rotor blade 36 in a manner similar to that above described in connection with arm 168. Correspondingly, arm 181 is secured to rotor blade 37.

From the foregoing the operation of the device should now be readily understandable. It will be seen that tilting of collar 120 in the manner previously described to the position as shown, for example, in Figure 3, assuming that the direction of forward flight of the plane is toward the right, as viewed in the drawing, and that the upper rotor is rotating in a counter-clockwise direction in a plane at right angles to the plane of the drawing, and the lower rotor in a clockwise direction in a similar plane, it will now be seen that the blade 35 is in a low pitch position or angle, while the blade 34 is in a high pitch position, the position varying from high to low throughout a complete revolution of the rotor, effected by the coaction of inner and outer rings 140 and 144. Correspondingly, it will be seen that in the position as shown in the drawing, the blades 37 and 36 are now in an intermediate position, and that as the lower rotor rotates and these blades assume respectively the positions of blades 35 and 34, blade 37 will assume a low pitch during half of its cycle of rotation and a high pitch during the other half thereof. Accordingly, since greater tractive force is exerted by both rotors during the halves of their cycles of rotation when they are moving towards the rear than during the halves of those cycles when they are moving towards the front, forward motion of the plane will result.

Obviously, rearward motion of the helicopter will be effected by reversing the angle of tilt of housing 120. When it is desired to lift the plane vertically, housing 120 is shifted to horizontal position equalizing the pitch of the blades throughout their full cycles of rotation. It will also be obvious that when it is desired to tilt the plane to the right or left, the collar 120 may be moved upwardly or downwardly in a vertical plane by means of the sleeve 76 and its associated controlling mechanism, and then as the housing moves upwardly, for example, the pitch of the blades of the upper rotor will be decreased, through the connection afforded by the links 154 and 155 and the arms 159 and 168, and the pitch of the blades of the lower rotor increased, through the action of links 150 and 151 on arms 181 and 184, vertical movement of the links by the collar serving to rotate the arms and their associated blades, and vice versa, whereby turning action is effected in the direction of rotation of the rotor exerting the greatest pressure against the air.

If, for any reason, such as power failure or other causes, it becomes necessary to land the plane absolutely vertically, the clutch mechanism of the motor is thrown out and the vertical fall of the helicopter effects reverse rotation of the blades of the rotors, which then act in a known manner to preclude too swift a fall of the plane.

This invention has been described in relation to a helicopter having upper and lower rotors of two blades each, and it will be readily understood that any desired number of blades may be utilized by the addition of appropriate parts to control the same.

From the foregoing it will now be seen that there is herein provided a helicopter which may be controlled as to vertical lift, forward and rearward motion, as well as directional motion, upwardly or downwardly or to the right or to the left, solely by variation in the pitch of the rotor blades, without the necessity of tilting the plane of rotation of the rotors with respect to the aircraft. It will also be seen that there is herein provided a device accomplishing all the objects of this invention, and many others, including advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a helicopter in combination, an upper rotor provided with rotatively mounted blades, a lower rotor provided with rotatively mounted blades, means including a drive shaft and a drive sleeve for rotating said rotors in opposite directions, a second sleeve coaxial with said first-mentioned sleeve and said drive shaft, a collar pivotally secured to said second sleeve, means pivotally connecting the hubs of said blades with said collar, means for tilting said collar to change the pitch of said blades during a cycle of rotation, and means for varying the relative position of said collar to vary the pitch on the blades of one of said rotors with respect to the blades of the other of said rotors, said last-mentioned means including a third sleeve coaxial with said second sleeve and secured to said housing, and means for moving said last-mentioned sleeve in a vertical direction with respect to the horizontal plane of rotation of said rotor blades.

THEODORE S. KERANEN.

REFERENCES CITED

The following references are of record in the file of this patent:

UNITED STATES PATENTS

| Number | Name | Date |
|---|---|---|
| 1,919,089 | Breguet et al. | July 18, 1933 |
| 2,122,928 | Breguet | July 5, 1938 |
| 2,256,918 | Young | Sept. 23, 1941 |
| 2,382,460 | Young | Aug. 14, 1945 |
| 2,394,846 | Cox | Feb. 12, 1946 |
| 2,410,533 | Thomson | Nov. 5, 1946 |

FOREIGN PATENTS

| Number | Country | Date |
|---|---|---|
| 155,985 | Austria | Apr. 25, 1939 |
| 878,912 | France | Nov. 2, 1942 |